(12) United States Patent
Maeda

(10) Patent No.: US 11,785,153 B2
(45) Date of Patent: Oct. 10, 2023

(54) IMAGE READING DEVICE AND RECORDING DEVICE

(71) Applicant: SEIKO EPSON CORPORATION, Tokyo (JP)

(72) Inventor: Hiroyuki Maeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/664,158

(22) Filed: May 19, 2022

(65) Prior Publication Data

US 2022/0377191 A1 Nov. 24, 2022

(30) Foreign Application Priority Data

May 20, 2021 (JP) ................................ 2021-085142

(51) Int. Cl.
H04N 1/00 (2006.01)
(52) U.S. Cl.
CPC ..... *H04N 1/00554* (2013.01); *H04N 1/00013* (2013.01); *H04N 1/00037* (2013.01); *H04N 1/00082* (2013.01); *H04N 1/00543* (2013.01); *H04N 1/00888* (2013.01)
(58) Field of Classification Search
CPC ........... G03G 21/1633; G03G 15/6502; G03G 21/1647; G03G 21/1676; G03G 2221/1654; G03G 15/0865; G03G 15/556; G03G 21/1842; G03G 2221/1684; G03G 2221/1687; G03G 15/0872; G03G 15/2028; G03G 15/2053; G03G 15/6511; G03G 15/6514; G03G 15/70; G03G 2215/2032; G03G 2221/1657; G03G 2221/169; B65H 1/04; B65H 1/12; B65H 2220/01; B65H 2220/04; B65H 2405/324; B65H 2407/21; B65H 2511/12; B65H 2511/22; B65H 2801/06; B65H 3/0669; H04N 1/00013; H04N 1/00037; H04N 1/00082; H04N 1/00543; H04N 1/00554; H04N 1/00888
USPC ........................................................ 358/474
See application file for complete search history.

(56) References Cited

U.S. PATENT DOCUMENTS

| 8,228,166 | B2 * | 7/2012 | Eberhard | ................ E05F 15/76 |
| | | | | 340/5.72 |
| 8,393,617 | B2 * | 3/2013 | Wang | ................. G03G 15/6538 |
| | | | | 271/223 |
| 9,725,943 | B2 * | 8/2017 | Matsui | .................. H04N 23/00 |
| 9,906,670 | B2 * | 2/2018 | Hayashi | ............. H04N 1/00588 |
| 11,221,580 | B2 * | 1/2022 | Okamoto | ............... G03G 15/80 |

(Continued)

FOREIGN PATENT DOCUMENTS

JP 2003-163770 6/2003

*Primary Examiner* — Negussie Worku
(74) *Attorney, Agent, or Firm* — WORKMAN NYDEGGER

(57) ABSTRACT

An image reading device includes: an original-document table at which an original document is mounted; a reading unit configured to read the original document mounted at the original-document table; an opening/closing section configured to be able to open and close the original-document table; a power source configured to apply power for opening and closing to the opening/closing section; a proximity sensor configured to output a detection signal in accordance with approach of a detection target; and a control unit configured to control the power source on a basis of the detection signal from the proximity sensor.

9 Claims, 13 Drawing Sheets

(56) References Cited

U.S. PATENT DOCUMENTS

| | | | | |
|---|---|---|---|---|
| 2007/0103740 A1* | 5/2007 | Shingai | .............. | H04N 1/00572 |
| | | | | 358/488 |
| 2008/0278774 A1* | 11/2008 | Enami | ................ | H04N 1/00997 |
| | | | | 358/475 |
| 2011/0058881 A1* | 3/2011 | Mitamura | ............ | H04N 1/0057 |
| | | | | 400/582 |
| 2012/0162690 A1* | 6/2012 | Ishiguro | ............. | H04N 1/00408 |
| | | | | 358/1.14 |
| 2013/0044334 A1* | 2/2013 | Igawa | ................. | G03G 15/607 |
| | | | | 356/625 |
| 2014/0125007 A1* | 5/2014 | Sakano | .................... | B65H 7/20 |
| | | | | 271/265.01 |
| 2014/0361146 A1* | 12/2014 | Shiraishi | ................ | E05F 15/77 |
| | | | | 250/206 |
| 2016/0208540 A1* | 7/2016 | Matsui | ................... | H04N 23/00 |
| 2016/0295049 A1* | 10/2016 | Hayashi | ............. | H04N 1/00588 |
| 2017/0094093 A1* | 3/2017 | Mori | ................. | H04N 1/00689 |
| 2018/0220027 A1* | 8/2018 | Kusu | ................. | H04N 1/00769 |

* cited by examiner

IMAGE READING DEVICE AND RECORDING DEVICE

The present application is based on, and claims priority from JP Application Serial Number 2021-085142, filed on May 20, 2021, the disclosure of which is hereby incorporated by reference herein in its entirety.

BACKGROUND

1. Technical Field

The present disclosure relates to an image reading device that reads an image on an original document, and also relates to a recording device including the image reading device.

2. Related Art

An image reading device includes an original-document table cover configured to open or close an original-document table or an original-document feeding device. In some cases, the original-document feeding device is also called an auto document feeder (ADF). An image forming device described in JP-A-2003-163770 includes a flat head scanner provided at an upper portion of the device body and serving as one example of the image reading device. This flat head scanner is provided with the ADF so as to be able to be opened and closed. This image forming device includes a foot switch, and is configured so as to be able to open or close the ADF by operating the foot switch.

In recent years, there are increasing users' needs for avoiding transmission of bacteria or virus by contact. With the image forming device described in JP-A-2003-163770, the ADF can be opened and closed by using the foot switch. However, this device involves contacting the foot switch and hence, is not sufficient to meet the users' needs. In addition, operations performed by the user in association with the contact to the image reading device are not limited to opening/closing of the ADF. Thus, it is desired to meet the users' needs in terms of operations other than opening/closing of the ADF.

SUMMARY

An image reading device according to the present disclosure that solves the problem described above includes an original-document table at which an original document is mounted, a reading unit configured to read the original document mounted at the original-document table, an opening/closing section configured to open and close the original-document table, a power source configured to apply power for opening and closing to the opening/closing section, a non-contact sensor configured to output a detection signal in accordance with approach of a detection target, and a control unit configured to control the power source on a basis of the detection signal from the non-contact sensor.

In addition, an image reading device according to the present disclosure includes an original-document table at which an original document is mounted, a reading unit configured to read the original document mounted at the original-document table, an original-document feeding device configured to open and close the original-document table and feed an original document to a position where the reading unit performs reading, the original document being set at a feeding tray at which the original document is mounted, an edge guide configured to guide a side edge of the original document set at the feeding tray and also configured to be displaced toward and away from the side edge, a power source configured to apply power of displacement to the opening/closing section, a non-contact sensor configured to output a detection signal in accordance with approach of a detection target, and a control unit configured to control the power source on a basis of the detection signal from the non-contact sensor.

In addition, an image reading device according to the present disclosure includes an original-document table at which an original document is mounted, a reading unit configured to read the original document mounted at the original-document table, an opening/closing section configured to open and close the original-document table, a power source configured to apply power for opening and closing to the opening/closing section, and a control unit configured to control the power source on a basis of a signal received from an external terminal.

DESCRIPTION OF EXEMPLARY EMBODIMENTS

Figure 1:
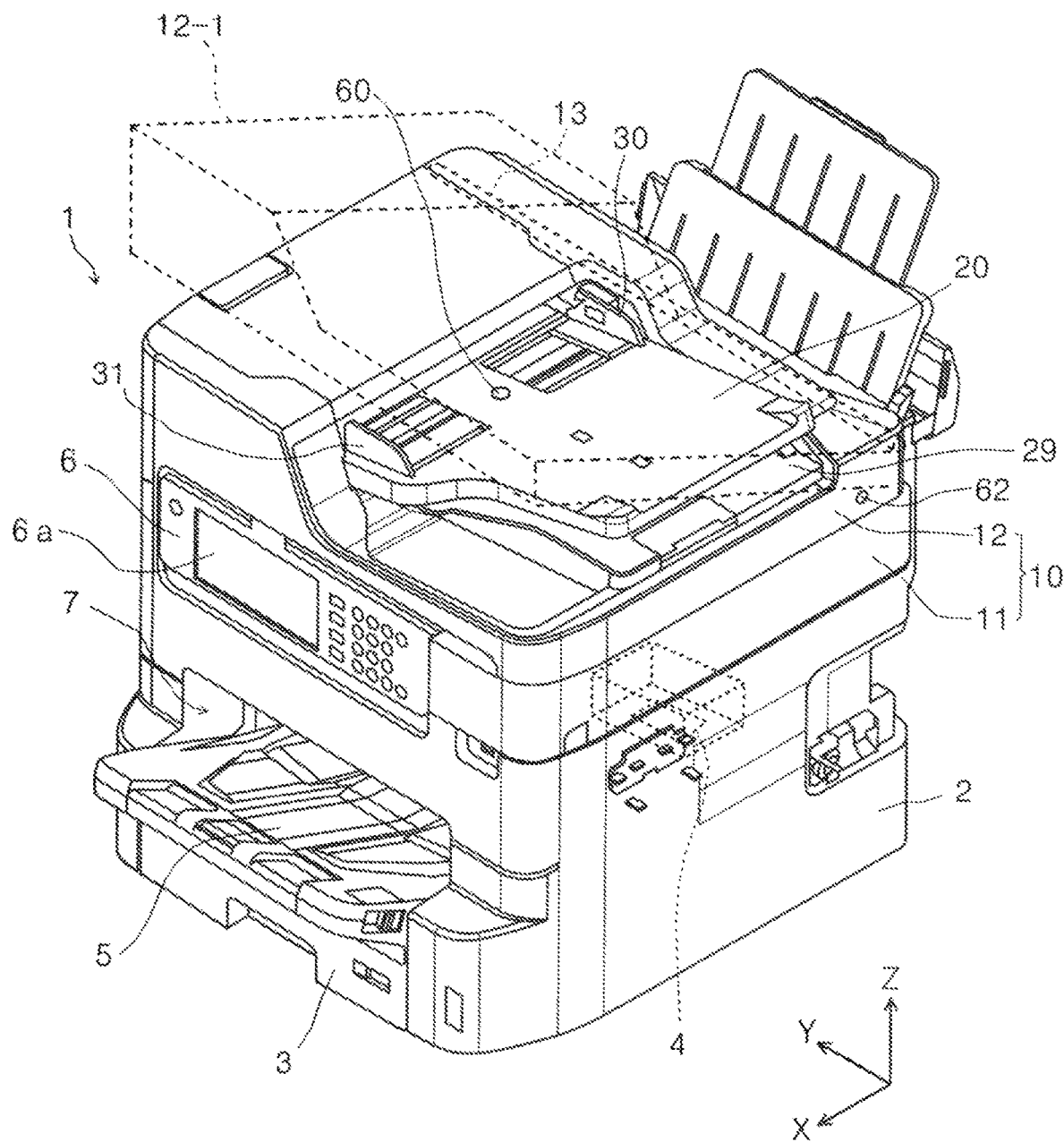
FIG. 1 is a perspective view illustrating an external appearance of a multifunction device including a scanner unit.

Below, the present disclosure will be described schematically.

An image reading device according to a first aspect includes: an original-document table at which an original document is mounted; a reading unit configured to read the original document mounted at the original-document table; an opening/closing section configured to be able to open and close the original-document table; a power source configured to apply power for opening and closing to the opening/closing section; a first proximity sensor configured to output a detection signal in accordance with approach of a detection target; and a control unit configured to control the power source on a basis of the detection signal from the first proximity sensor.

With the present aspect, the opening/closing section that can open and close the original-document table is configured such that the control unit controls the power source to open and close the opening/closing section on the basis of the detection signal from the proximity sensor that outputs the detection signal in accordance with approach of the detection target. This allows a user to open and close the opening/closing section without touching the opening/closing section. Thus, it is possible to meet users' needs for avoiding touching the device.

In the first aspect, a second aspect includes an open-close detection unit configured to detect open or close of the opening/closing section, and the control unit issues an alert upon determining that the opening/closing section is opened or closed without driving of the power source, on the basis of a detection signal from the open-close detection unit.

With the present aspect, the open-close detection unit that detects open or close of the opening/closing section is provided, and the control unit issues an alert when the opening/closing section is determined to be opened or closed without driving of the power source, on the basis of a detection signal from the open-close detection unit. Thus, it is possible to give a user a warning when the user accidentally comes into contact with the opening/closing section.

In the first or second aspect, a third aspect is configured such that the opening/closing section is an original-document feeding device configured to feed an original document to a position where the reading unit performs reading, the original document being set at a feeding tray at which the original document is mounted.

With the present aspect, the opening/closing section is configured as the original-document feeding device that feeds an original document to a position where the reading unit performs reading, and the original document is set at the feeding tray at which the original document is mounted. This configuration makes it possible to obtain the operation and effect of the first or second aspect described above.

An image reading device according to a fourth aspect includes: an original-document table at which an original document is mounted; a reading unit configured to read the original document mounted at the original-document table; an original-document feeding device configured to open and close the original-document table and feed an original document to a position where the reading unit performs reading, the original document being set at a feeding tray at which the original document is mounted; an edge guide configured to guide a side edge of the original document set at the feeding tray and also configured to be displaced toward and away from the side edge; a power source configured to apply power for displacement to the side edge; a second proximity sensor configured to output a detection signal in accordance with approach of a detection target; and a control unit configured to control the power source on a basis of the detection signal from the second proximity sensor.

With the present aspect, the edge guide that guides the side edge of the original document is configured to be displaced by the control unit controlling the power source on the basis of a detection signal from the proximity sensor configured to output the detection signal in accordance with approach of a detection target. This makes it possible to guide the side edge of the original document such that a user does not touch the edge guide. Thus, it is possible to meet the users' needs for avoiding touching the device.

An image reading device according to a fifth aspect includes: an original-document table at which an original document is mounted; a reading unit configured to read the original document mounted at the original-document table; an original-document feeding device configured to open and close the original-document table and feed an original document to a position where the reading unit performs reading, the original document being set at a feeding tray at which the original document is mounted; an edge guide configured to guide a side edge of the original document set at the feeding tray and also configured to be displaced toward and away from the side edge; a power source configured to apply power for displacement to the side edge; an original-document detection sensor configured to detect presence or absence of the original document on the feeding tray; and a control unit configured to control the power source, in which the control unit receives a detection signal from the original-document detection sensor, and controls the power source to cause the edge guide to retract in a direction of retraction when no original document exists at the feeding tray, and cause the edge guide to advance in a direction of advance when the original document is set at the feeding tray.

With the present aspect, the edge guide that guides the side edge of the original document is configured to be displaced by the control unit controlling the power source on the basis of a detection signal from the original-document detection sensor configured to detect presence or absence of the original document at the feeding tray. This makes it possible to guide the side edge of the original document such that a user does not touch the edge guide. Thus, it is possible to meet the users' needs for avoiding touching the device.

In any one of the first to fifth aspects, a sixth aspect is configured such that the control unit checks presence or absence of the original document at the original-document table after a predetermined period elapses from a reading operation by the reading unit is completed, and the control unit issues an alert when the original document exists at the original-document table.

With the present aspect, the control unit checks presence or absence of the original document at the original-document table after a predetermined period elapses from a reading operation by the reading unit is completed, and issues an alert when the original document exists at the original-document table. This makes it possible to prevent a user other than the user who mounts the original document at the original-document table, from looking at the original document mounted at the original-document table. Thus, it is possible to improve information security.

In the fourth or fifth aspect, a seventh aspect is configured such that the original-document feeding device includes: an discharge tray configured to support the original document that is read and discharged; a cover member configured to be opened and closed, and also configured to enable removal of the original document from the discharge tray in an opened state and disable removal of the original document from the discharge tray in a closed state; and a lock unit configured to switch between a locked state in which the cover member is locked in the closed state and a lock release state in which the lock is released, in which, when the reading is performed by the reading unit on the basis of an instruction from an external terminal, the control unit does not release lock of the lock unit on the basis of an instruction that is not from the external terminal.

With the present aspect, by using a configuration including the cover member that disables removal of the original document from the discharge tray in the closed state, when the reading is performed by the reading unit on the basis of an instruction from an external terminal, the control unit does not release lock of the lock unit on the basis of an instruction that is not from the external terminal. This makes it possible to prevent a user other than a user who causes reading to be performed, from looking at the original document mounted at the discharge tray. Thus, it is possible to improve the information security.

An image reading device according to an eighth aspect includes: an original-document table at which an original document is mounted; a reading unit configured to read the original document mounted at the original-document table; an opening/closing section configured to open and close the original-document table; a power source configured to apply power for opening and closing to the opening/closing section; and a control unit configured to control the power source on a basis of a signal received from an external terminal.

With the present aspect, the opening/closing section that can open and close the original-document table is configured to be opened and closed by the control unit controlling the power source on the basis of a signal received from the external terminal. This makes it possible to open and close the opening/closing section such that a user does not touch the opening/closing section. Thus, it is possible to meet users' needs for avoiding touching the device.

A recording device according to a ninth aspect includes: an apparatus body including a recording section configured to perform recording on a medium; and the image reading device according to any one of the first to eighth aspects provided at an upper portion of the apparatus body. With the present aspect, by using the recording device, it is possible to obtain operation and effect of any one of the first to eighth aspects described above.

Below, the present disclosure will be specifically described.

In the following description, a scanner unit 10 is given as one example of an image reading device, for example. In addition, a multifunction device 1 is given as one example of a recording device, for example.

In each of the drawings, the X-Y-Z coordinate system is a Cartesian coordinate system. The Y-axis direction is a width direction of the device as viewed from a user of the multifunction device 1. The +Y direction is a left direction and the −Y direction is a right direction as viewed from a user of the multifunction device 1. The user of the multifunction device 1 is assumed to be at a position that is opposed to an operation unit 6. The X-axis direction is a depth direction of the device as viewed from a user of the multifunction device 1. The +X direction is a direction toward the front face of the device from the back surface of the device, and the −X direction is a direction toward the back surface of the device from the front face.

The Z-axis direction is a vertical direction and is a device height direction. The +Z direction is a vertically upward direction, and the −Z direction is vertically downward direction.

The multifunction device 1 illustrated in FIG. 1 includes a recording unit 2 that constitutes an apparatus body and a scanner unit 10 provided at an upper portion of the recording unit 2, and also has both a recording function and an image-reading function.

An operation unit 6 is provided at an upper portion of a front face of the multifunction device 1. The operation unit 6 includes a display unit 6a comprised of a liquid crystal panel as one example, and various types of operation buttons. By operating the operation unit 6, it is possible to input, into the multifunction device 1, various types of instructions such as a recording operation to the recording unit 2 or the like and various types of instructions such as image reading operation to the scanner unit 10 or the like.

In the multifunction device 1, the recording unit 2 includes, at a lower portion, a medium accommodating cassette 3 configured to accommodate a medium typified by a recording sheet. A recording section 4 is provided within the recording unit 2 to perform recording by the recording section 4 on a medium fed out from the medium accommodating cassette 3. As one example, the recording section 4 is configured to include an ink discharging head configured to discharge ink to the medium. After recording, the medium is discharged from the discharge portion 7, and is mounted at a medium discharge tray 5.

In addition, the scanner unit 10 includes a scanner main body 11 configured to read an original document mounted at an original-document table 14 (see FIG. 2), and an auto document feeder (ADF) 12 configured to be able to automatically convey and read the original document mounted at the original-document feeding tray 20. The ADF 12 is one example of an original-document feeding device.

The ADF 12 is provided rotatably around a rotary shaft 13 that is parallel to the Y-axis direction. The ADF 12 is one example of an opening/closing section, and is configured to pivot to switch between a closed posture as illustrated with the solid line in FIG. 1 and an opened posture as illustrated with the chain dash and the reference character 12-1 in FIG. 1. At the time when the ADF 12 pivots, the end portion of the ADF 12 at the +X direction serves as a free end at the time of rotation. In a state where the ADF 12 is closed, an original document mat 15 (see FIG. 2) provided at a surface of the ADF 12 at the −Z direction presses, toward the original-document table 14, the original document that has been mounted at the original-document table 14 (see FIG. 2). Then, by bringing the ADF 12 into the opened state, it is possible to remove the original document that has been mounted at the original-document table 14 (see FIG. 2).

The ADF 12 includes the original-document feeding tray 20 at which an original document prior to being fed is mounted. The original-document feeding tray 20 includes a first edge guide 30 and a second edge guide 31 each configured to guide a side edge of the mounted original document. The first edge guide 30 and the second edge guide 31 are provided so as to be able to be displaced along the X-axis direction. Upon receiving power of an edge-guide displacement motor 58 (see FIG. 3) that will be described later, these guides are displaced in a direction in which they are brought closer to each other or are displaced in a direction in which they are moved away from each other.

Figure 3:
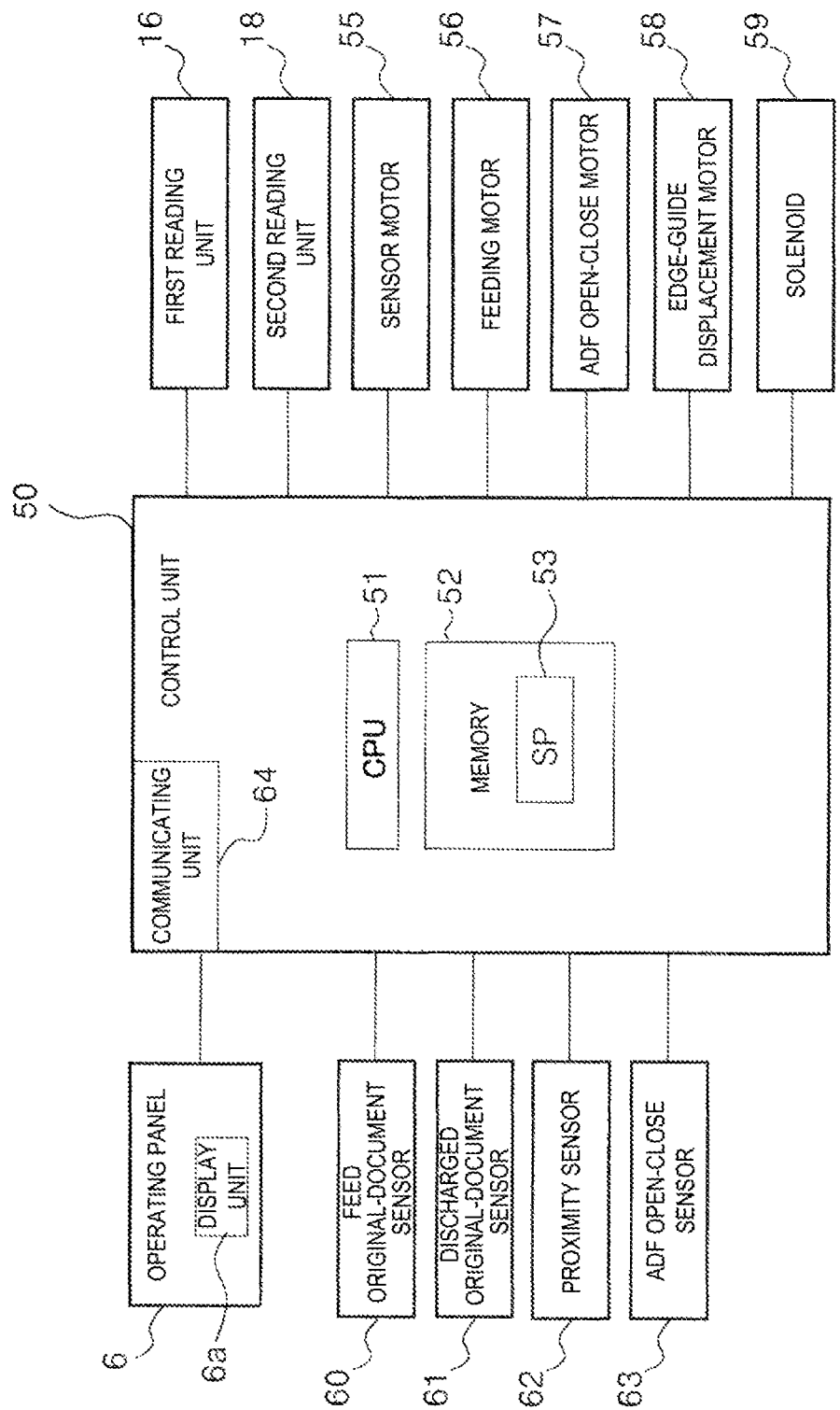
FIG. 3 is a block diagram illustrating a control system of the scanner unit.
Figure 4:
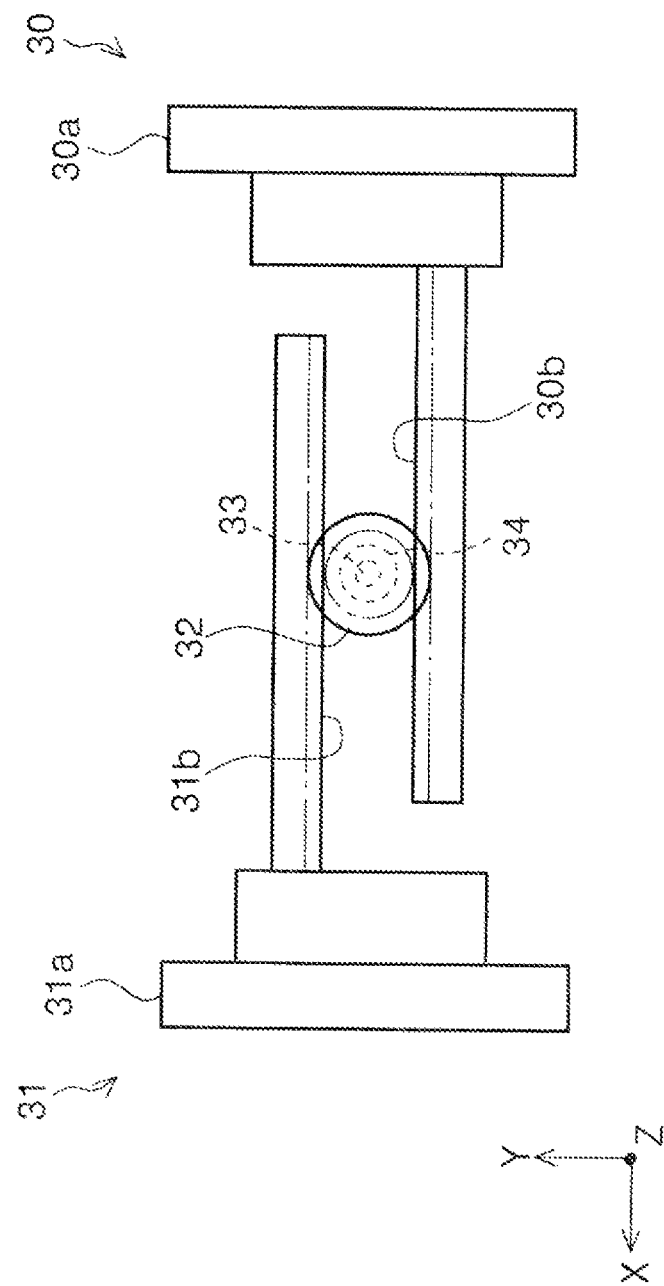
FIG. 4 is a diagram illustrating a drive mechanism configured to displace a first edge guide and a second edge guide.

FIG. 4 is a diagram illustrating a drive mechanism configured to drive the first edge guide 30 and the second edge guide 31. The first edge guide 30 includes a guiding portion 30a and a rack portion 30b extending from the guiding portion 30a toward the +X direction. The second edge guide 31 includes a guiding portion 31a, and a rack portion 31b extending from the guiding portion 31a toward the −X direction. A pinion toothed gear 32 is provided between the rack portion 30b and the rack portion 31b. The pinion toothed gear 32 meshes with both the rack portion 30b and the rack portion 31b. Upon receiving power from the edge-guide displacement motor 58 (see FIG. 3), the pinion toothed gear 32 rotates. This causes the first edge guide 30 and the second edge guide 31 to be displaced in a direction in which they are brought close to each other or to be displaced in a direction in which they are moved away from each other.

Note that a friction clutch 34 is provided between the rotary shaft 33 of the pinion toothed gear 32 and the pinion toothed gear 32. When the first edge guide 30 and the second edge guide 31 come into contact with side edges of the original document, this configuration makes it possible to prevent each of the edge guides from causing excessive pressing force to act on the side edges of the original document to deform the original document. In addition, this configuration eliminates the need of strictly managing the amount of displacement of each of the edge guides, which makes it easy to control the position determination of each of the edge guides.

Returning to FIG. 1, an original-document discharging tray 29 configured to receive an original document that has been read and discharged is provided at a lower portion of the original-document feeding tray 20. The original document that has been discharged is supported by the original-document discharging tray 29.

Next, the configuration of the scanner unit 10 will be further described with reference to FIG. 2. The scanner main body 11 includes a first reading unit 16 serving as one example of a reading unit. The first reading unit 16 is provided at a downward side of the original-document table 14 so as to extend in the X-axis direction, and receives power from a sensor motor 55 (see FIG. 3) to move in the Y-axis direction. The original-document table 14 is made of a colorless, transparent member, and is made, for example, of glass. An optical-type reading unit such as a CIS system or CCD system is used for the first reading unit 16.

The first reading unit 16 is configured to be able to not only read the original document mounted at the original-document table 14 but also read the original document conveyed by the ADF 12.

Figure 2:
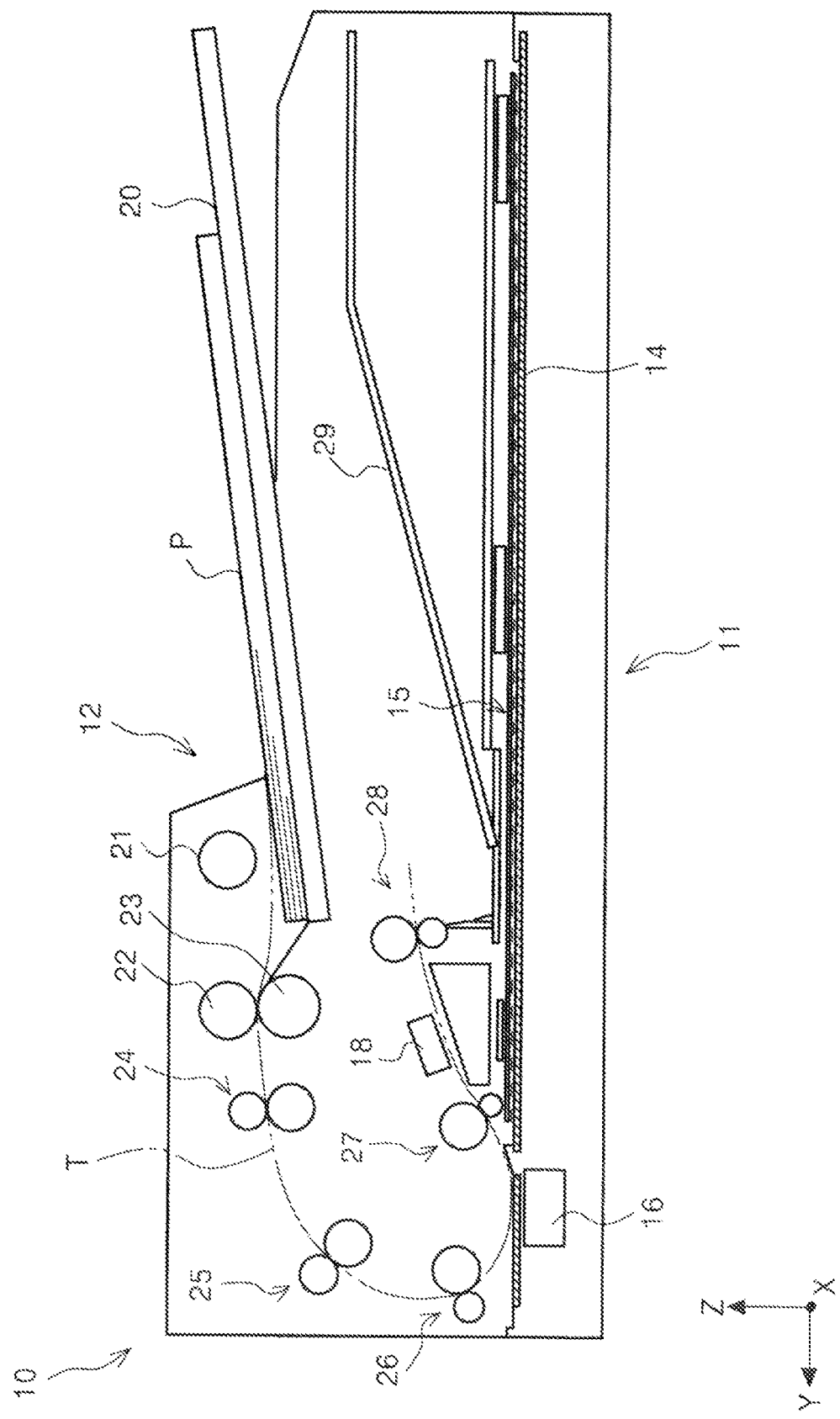
FIG. 2 is a diagram illustrating an original-document transfer path in the scanner unit.

The chain dash T in FIG. 2 illustrates a transfer path for the original document P in the ADF 12. In addition, the reference character P represents the original document mounted at the original-document feeding tray 20. The transfer path T is a path used for the original document P picked up by a pick roller 21 from the original-document feeding tray 20 and extending to a portion where the original document P is discharged to the original-document discharging tray 29.

Using the ADF 12 enables the first reading unit 16 and a second reading unit 18 that will be described later to read both sides of the original document P.

The original document P before being fed in the ADF 12 is mounted at the original-document feeding tray 20. The pick roller 21 is provided above the +Y direction of the original document P mounted at the original-document feeding tray 20, that is, above the leading edge and its surroundings of the original document P in a feeding direction. The pick roller 21 is configured to be able to switch between a detached state in which the roller is stay away from the original document P at the original-document feeding tray 20 and a contact state in which the roller is in contact with the original document P at the original-document feeding tray 20. In a state where the pick roller 21 is in the contact state, the pick roller 21 picks up the original document P at the original-document feeding tray 20, and feeds it to a feed roller 22 downstream.

A separation roller 23 configured to nip the original document P between the feed roller 22 and the separation roller 23 to make it separated is provided at a position that is opposed to the feed roller 22. A first transport roller pair 24 is provided downstream of the feed roller 22 and the separation roller 23.

In the transfer path T, a section extending from the first transport roller pair 24 to the fourth transport roller pair 27 is a curved inversion path where the original document P is caused to be inverted in a curved manner. In this curved inversion path, the direction of the original document P is inverted.

Furthermore, the first reading unit 16 reads the original document P at the downstream of the third transport roller pair 26, and the second reading unit 18 reads the original document P at the downstream of the fourth transport roller pair 27. An optical-type reading unit such as a CIS system or CCD system is used for the second reading unit 18.

The first reading unit 16 reads the upper surface of the original document P in a state of being mounted at the original-document feeding tray 20, and the second reading unit 18 reads the lower surface of the original document P in a state of being mounted at the original-document feeding tray 20.

An discharge roller pair 28 is provided downstream of the second reading unit 18. After reading is performed by the first reading unit 16 or the second reading unit 18, the original document document P is discharged to the original-document discharging tray 29 by the discharge roller pair 28.

Next, a control system by the scanner unit 10 will be described with reference to FIG. 3. A control unit 50 controls various types of operations in the multifunction device 1 that includes feeding, conveying, recording and discharging of a medium in the recording unit 2 and also includes feeding, conveying, reading, discharging, or the like of an original document in the scanner unit 10. Note that FIG. 3 illustrates a control system from the viewpoint of controlling the scanner unit 10. Illustration or description of the control system in the recording unit 2 will not be made below.

Signals from the operation unit 6 are inputted into the control unit 50. In addition, signals used to achieve an UI at the display unit 6a provided in the operation unit 6 are transmitted from the control unit 50 to the operation unit 6.

The control unit 50 controls the first reading unit 16, the second reading unit 18, the sensor motor 55, a feeding motor 56, an ADF open-close motor 57, the edge-guide displacement motor 58, and a solenoid 59, as the target of control.

Detection signals from a feed original-document sensor 60, an discharged original-document sensor 61, a proximity sensor 62, and an ADF open-close sensor 63 are inputted into the control unit 50. In addition, reading signals from the first reading unit 16 and the second reading unit 18 are inputted into the control unit 50.

The control unit 50 includes a CPU 51 and a memory 52. The CPU 51 performs various types of processes in accordance with a program ("SP" in FIG. 3) 53 stored in the memory 52. The memory 52 is a non-volatile readable and writable memory, and holds the program 53 described above, various types of parameters, and the like. In addition, the memory 52 also holds various types of setting information inputted by a user through the operation unit 6.

The control unit 50 includes a communicating unit 64. The communicating unit 64 is a communication module used to perform wireless communication with an external terminal such as a personal digital assistant. The communicating unit 64 is a communication module used to perform wireless communication, for example, in accordance with a Wi-Fi system. Wi-Fi is a system used to perform wireless communication in accordance with the standard of IEEE802.11 that is an international standard. Note that the "Wi-Fi" as a name is a registered trademark of the Wi-Fi Alliance. However, the communicating unit 64 is not limited to this. It may be possible to employ a communication module configured to perform wireless communication using a Bluetooth system in accordance with the standard of IEEE802.15.1 that is an international standard, or infrared ray communication, or other wireless communication system. Furthermore, the communicating unit 64 may be configured to include two or more items from among the various types of communication modules described above.

The sensor motor 55 is a power source used to move the first reading unit 16 in the Y-axis direction. The feeding motor 56 is a power source used to drive each of the rollers provided in the transfer path T illustrated in FIG. 2. The ADF open-close motor 57 is a power source used to rotate, that is, to open and close the ADF 12. Power is transmitted from the ADF open-close motor 57 to the ADF 12 through a power transmitting mechanism that is not illustrated. The edge-guide displacement motor 58 is a power source used to displace the first edge guide 30 and the second edge guide 31 in the manner described above. The solenoid 59 will be described later in detail.

The feed original-document sensor 60 is a sensor (see also FIG. 1) used to detect presence or absence of the original document at the original-document feeding tray 20. The discharged original-document sensor 61 is a sensor used to detect presence or absence of the original document at the original-document discharging tray 29. For the feed original-document sensor 60 and the discharged original-document sensor 61, it may be possible to use a reflection type optical sensor as one example or use a contact type sensor.

The proximity sensor 62 is one example of a non-contact sensor. In the present embodiment, the proximity sensor 62 is provided at a position close to the rotary shaft 13 at the side surface of the ADF 12 at the −Y direction, as illustrated in FIG. 1. The proximity sensor 62 is a sensor configured to output a detection signal according to approach of a detection target. In the present embodiment, the detection target is assumed to be a hand of a user. Upon a user bringing its hand close to the proximity sensor 62, the proximity sensor 62 outputs, to the control unit 50, the detection signal according to this approach. As the proximity sensor 62, it may be possible to use a sensor of a type such as a known electrostatic capacitor type, an ultrasonic wave type, or an infrared ray type.

The ADF open-close sensor 63 is one example of an open-close detection unit configured to detect open or close of the ADF 12. For example, the ADF open-close sensor 63 can be configured to include a first open-close sensor (not illustrated) in which a detection signal changes upon the ADF 12 being brought into a fully closes state, and a second open-close sensor (not illustrated) in which a detection signal changes upon the ADF 12 being brought into a fully opened state. With such a configuration, it is possible to detect whether the ADF 12 is in the fully closed state or in the fully opened state or in a state between the fully closed state and the fully opened state. Note that, in addition, it may be possible to use a rotary encoder configured to detect rotation of the ADF 12 as the open-close detection unit. Furthermore, when a user operates the ADF 12 to rotate it, the electric current value of the ADF open-close motor 57 changes. Thus, it may be possible to employ a configuration in which a change in such an electric current value is detected to detect that the ADF 12 is opened and closed. In this case, the control unit 50 constitutes the open-close detection unit.

Next, various types of control performed by the control unit 50 will be described with reference to FIG. 5 and thereafter.

Figure 5:
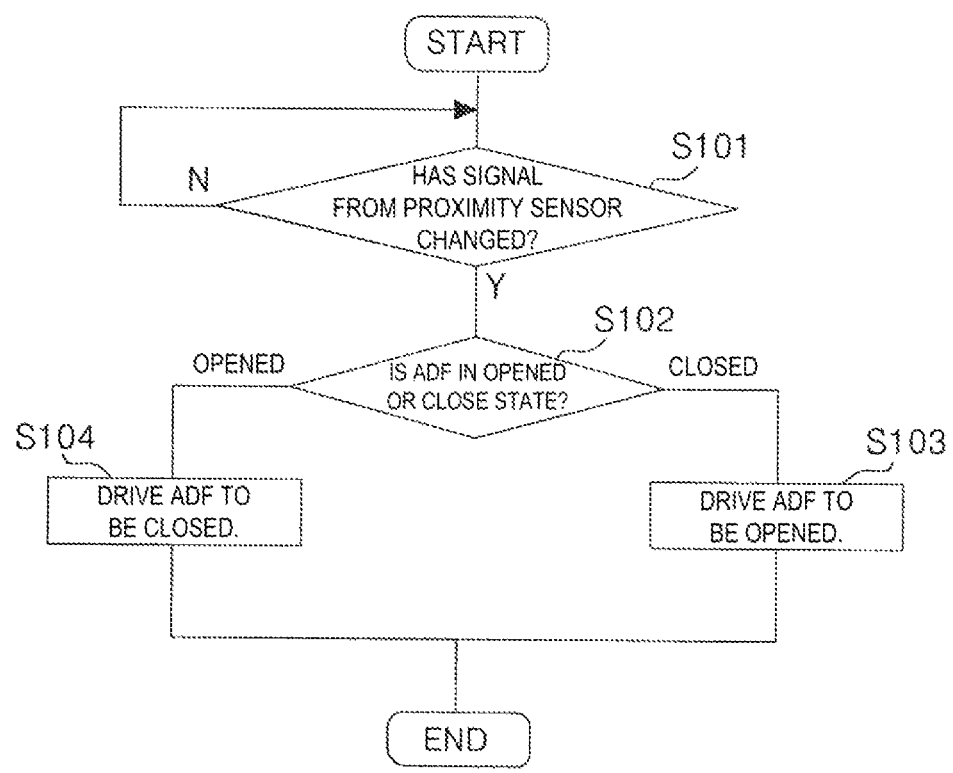
FIG. 5 is a flowchart showing a flow of performing control to open and close an ADF that employs a proximity sensor.

In FIG. 5, when a user hovers its hand over the proximity sensor 62 to change a signal from the proximity sensor 62 (Yes in step S101), the control unit 50 determines whether the ADF 12 is opened or closed, on the basis of a detection signal from the ADF open-close sensor 63 (step S102). Thus, when the ADF 12 is closed, the ADF open-close motor 57 is caused to drive in a direction in which the ADF 12 opens (step S103), and when the ADF 12 is opened, the ADF open-close motor 57 is caused to drive in a direction in which the ADF 12 closes (step S104).

In this manner, the scanner unit 10 is configured such that the control unit 50 controls the ADF open-close motor 57 on the basis of the detection signal from the proximity sensor 62 to open and close the ADF 12. Thus, it is possible to open and close the ADF 12 such that the user does not touch the ADF 12. This makes it possible to meet users' needs for avoiding touching the device.

Figure 6:
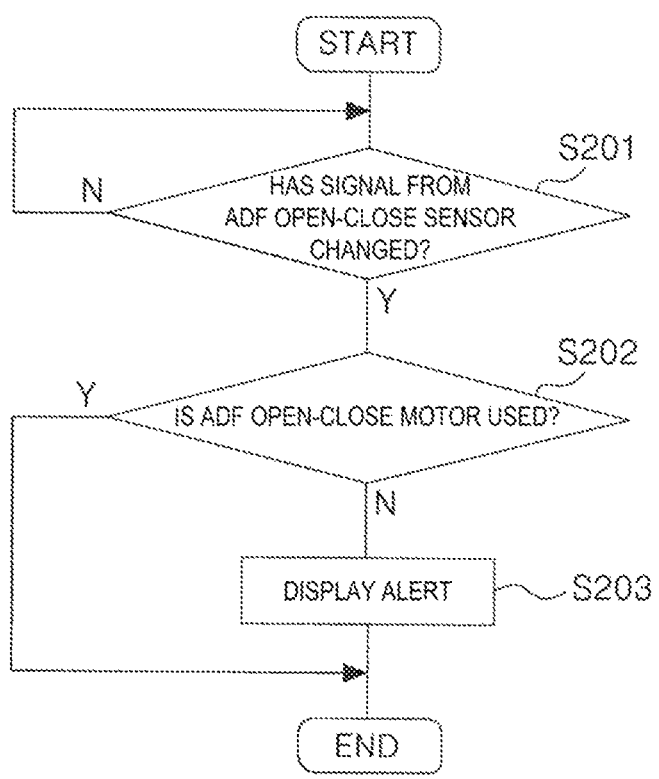
FIG. 6 is a flowchart showing a flow of issuing an alert using an ADF open-close sensor.

Note that, when the ADF 12 is opened or closed by the hand of the user, the control unit 50 causes the display unit 6*a* to display an alert. Specifically, in FIG. 6, when a detection signal from the ADF open-close sensor 63 changes (Yes in step S201), that is, when open or close of the ADF 12 is detected, the control unit 50 determines whether or not the ADF 12 is opened or closed by the power of the ADF open-close motor 57 (step S202). When the open or close of the ADF 12 is not performed by the power of the ADF open-close motor 57 (No in step S202), the control unit 50 causes the display unit 6*a* to display an alert (step S203). Note that, when open or close of the ADF 12 is performed by the power of the ADF open-close motor 57 (Yes in step S202), the display of the alert is not performed.

In this manner, when open or close of the ADF 12 is detected without driving of the ADF open-close motor 57, the control unit 50 issues an alert. Thus, it is possible to give a user a warning when the user accidentally comes into contact with the ADF 12.

Note that, as for the alert display in step S203, it is possible to display a message such as "Please do not touch the device", "Please disinfect hands, fingers, and portions of the device that was touched", or the like, for example.

Next, a displacement operation of the edge guide using a non-contact sensor will be described with reference to FIG. 7. Note that the present example utilizes a detection signal from the proximity sensor 62 for the displacement operation of the edge guides, whereas the detection signal from the proximity sensor 62 is not used for an operation of opening and closing the ADF 12. However, it is needless to say that it may be possible to employ a configuration in which a proximity sensor is further provided, and another proximity sensor is used to perform the operation of opening and closing the ADF 12 and perform the displacement operation of the edge guides.

Figure 7:
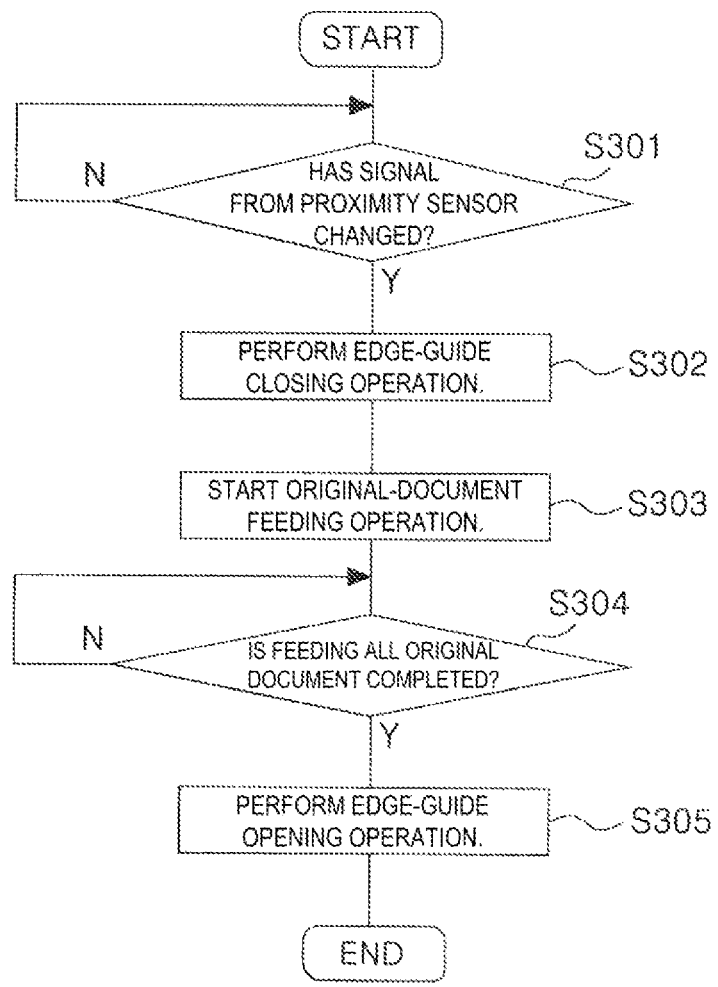
FIG. 7 is a flowchart showing a flow of controlling displacement of an edge guide using a proximity sensor.

In FIG. 7, when a user hovers its hand over the proximity sensor 62 to change a signal from the proximity sensor 62 (Yes in step S301), the control unit 50 controls the edge-guide displacement motor 58 to perform an operation of closing the edge guides (step S302). Note that the operation of closing the edge guide is an operation in which the first edge guide 30 and the second edge guide 31 are displaced in a direction in which they are brought close to each other. On the other hand, the operation of opening the edge guides is an operation in which the first edge guide 30 and the second edge guide 31 are displaced in a direction in which they are moved away from each other. In addition, in particular, in the present example, the amount of displacement of the first edge guide 30 and the second edge guide 31 in the operation of opening the edge guides and the operation of closing the edge guides is set to be the maximum possible amount of displacement.

Next, the control unit 50 starts an original-document feeding operation (step S303). Then, when the entire original-document feeding operation is completed (Yes in step S304), more specifically, when no original document exists at the original-document feeding tray 20 on the basis of the detection signal from the feed original-document sensor 60, an edge-guide opening operation is performed (step S305). With this operation, when a user sets the next original document at the original-document feeding tray 20, the distance between the first edge guide 30 and the second edge guide 31 is already set at the maximum distance. Thus, the user can set the original document at the original-document feeding tray 20 without operating the first edge guide 30 or the second edge guide 31.

In this manner, the scanner unit 10 is configured such that the first edge guide 30 and the second edge guide 31 configured to guide side edges of an original document are displaced by the control unit 50 controlling the edge-guide displacement motor 58 on the basis of a detection signal from the proximity sensor 62 that is a non-contact sensor configured to output a detection signal according to approach of the detection target. This makes it possible to guide the side edges of the original document such that a user does not touch the first edge guide 30 or the second edge guide 31. Thus, it is possible to meet users' needs for avoiding touching the device.

Figure 8:
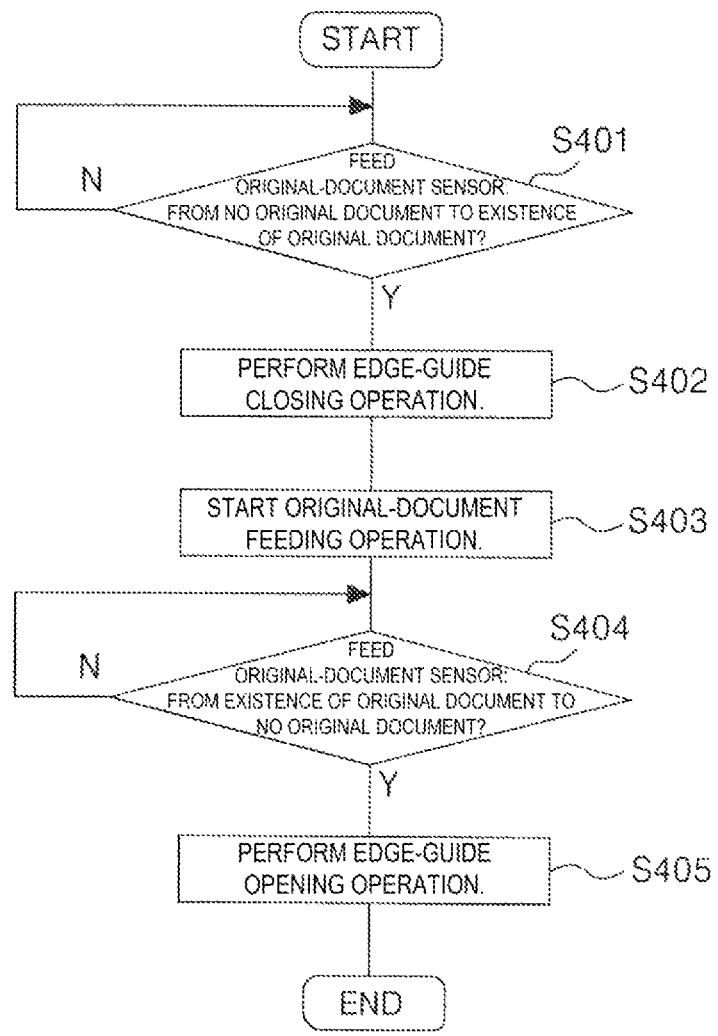
FIG. 8 is a flowchart showing a flow of controlling displacement of an edge guide using a feed original-document sensor.

The operation of displacing the edge guides may not be performed on the basis of the proximity sensor 62 and may be based on a detection signal from the feed original-document sensor 60. In FIG. 8, upon detecting a change from a state in which no original document exists at the original-document feeding tray 20 to a state in which an original document exists on the basis of a detection signal from the feed original-document sensor 60 (Yes in step S401), the control unit 50 performs an edge-guide closing operation (step S402). Then, the control unit 50 starts the original-document feeding operation (step S403). After this, when no original document exists at the original-document feeding tray 20 on the basis of a detection signal from the feed original-document sensor 60 (Yes in step S404), that is, when the entire original-document feeding operation is completed, the edge-guide opening operation is performed (step S405). With this operation, when a user sets the next original document at the original-document feeding tray 20, the distance between the first edge guide 30 and the second edge guide 31 is already set at the maximum distance. Thus, the user can set the original document at the original-document feeding tray 20 without operating the first edge guide 30 or the second edge guide 31.

In this manner, the scanner unit 10 is configured such that the first edge guide 30 and the second edge guide 31 configured to guide side edges of the original document are displaced by the control unit 50 controlling the edge-guide displacement motor on the basis of a detection signal from the original-document detection sensor, that is, the feed original-document sensor 60 configured to detect presence or absence of the original document at the original-document feeding tray 20. This makes it possible to guide the side edges of the original document such that a user does not touch the first edge guide 30 or the second edge guide 31. Thus, it is possible to meet users' needs for avoiding touching the device.

Next, an example of control in a case where an original document is mounted at the original-document table 14 and is read will be described with reference to FIG. 9.

Upon completion of reading, by the first reading unit 16, of an original document at the original-document table 14 (Yes in step S501), the control unit 50 starts to count time (step S502). Then, after a predetermined period that has been determined in advance elapses (Yes in step S503), the first reading unit 16 is used to detect whether or not an original document exists at the original-document table 14 (step S504). Thus, when an original document exits at the original-document table 14 (Yes in step S504), an alert is displayed at the display unit 6*a* (step S505).

In this manner, after a predetermined period elapses from the reading operation by the first reading unit 16 is completed, the control unit 50 checks presence or absence of an original document at the original-document table 14 using the first reading unit 16. When an original document exists at the original-document table 14, the control unit 50 issues an alert. This makes it possible to prevent a user other than the user who mounts the original document at the original-document table 14, from looking at the original document mounted at the original-document table 14. Thus, it is possible to improve the information security. Note that, as for the alert display in step S505, it is possible to display a message such as "Please remove the original document", "The original document is left on the original-document table", or the like, for example. Note that, in place of the alert display in step S505 or in addition to the alert display, it may be possible to issue a warning sound.

Furthermore, it may be possible to provide another sensor in place of the first reading unit 16 to detect presence or absence of an original document at the original-document table 14 using this sensor.

Next, control of the scanner unit 10 using an external terminal will be described. The multifunction device 1 is configured so as to be able to implement various types of operations from a personal digital assistant serving as one example of an external terminal. A smartphone is given as one example of the personal digital assistant.

Figure 10:
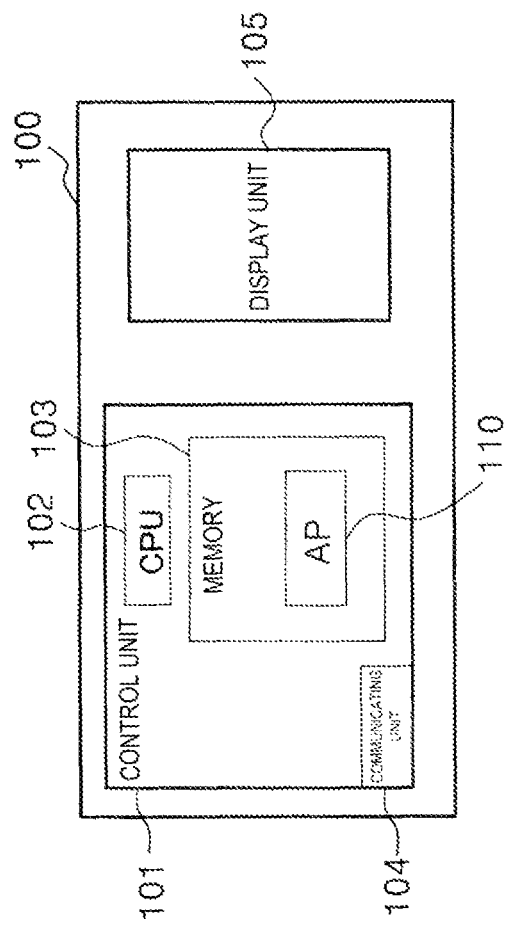
FIG. 10 is a block diagram illustrating a control system of a personal digital assistant serving as one example of an external terminal.

A personal digital assistant 100 includes a control unit 101 and a display unit 105 as illustrated in FIG. 10. In the present embodiment, the display unit 105 is configured as a touch panel to display various types of information, and achieves an UI configured to receive various types of setting operations by a user. The user performs various types of setting operation or implementation operation in accordance with the UI displayed at the display unit 105.

Signals from the display unit 105 are inputted into the control unit 101. In addition, signals used to achieve an UI at the display unit 105 are transmitted from the control unit 101 to the display unit 105.

The control unit 101 includes a CPU 102 and a memory 103. The CPU 102 performs various types of processes in accordance with a program stored in the memory 103 to control the display unit 105. The memory 103 is a non-volatile readable and writable memory, and holds a program ("AP" in FIG. 10) 110 that the CPU 102 implements, various types of parameters, and the like.

The control unit 101 includes a communicating unit 104. In addition to the communication module used to perform mobile body communication, the communicating unit 104 includes a communication module used to perform wireless communication in accordance with a Wi-Fi system. Note that the communicating unit 104 may include a communication module used to perform wireless communication in accordance with a Bluetooth system or may include a communication module used to perform infrared ray communication or other wireless communication systems. That is, the communicating unit 104 is configured to be able to establish communication between at least the multifunction device 1 and the control unit 50.

The control unit 50 of the multifunction device 1 is able to perform various types of control on the basis of signals received from the personal digital assistant 100, and the control includes the operation of opening and closing the ADF 12. Thus, a user can open and close the ADF 12 without touching the ADF 12, and it is possible to meet users' needs for avoiding touching to the device.

Note that, by using the personal digital assistant 100, it is possible to perform the operation of displacing the first edge guide 30 and the second edge guide 31 or the reading operation, in addition to the operation of opening and closing the ADF 12. Furthermore, it is preferable that all operation settings that can be implemented through the operation unit 6 included in the multifunction device 1 can be implemented in the personal digital assistant 100. In addition, it is preferable that the display of the display unit 6a included in the operation unit 6 is equal to the display of the display unit 105 included in the personal digital assistant 100.

Figure 9:
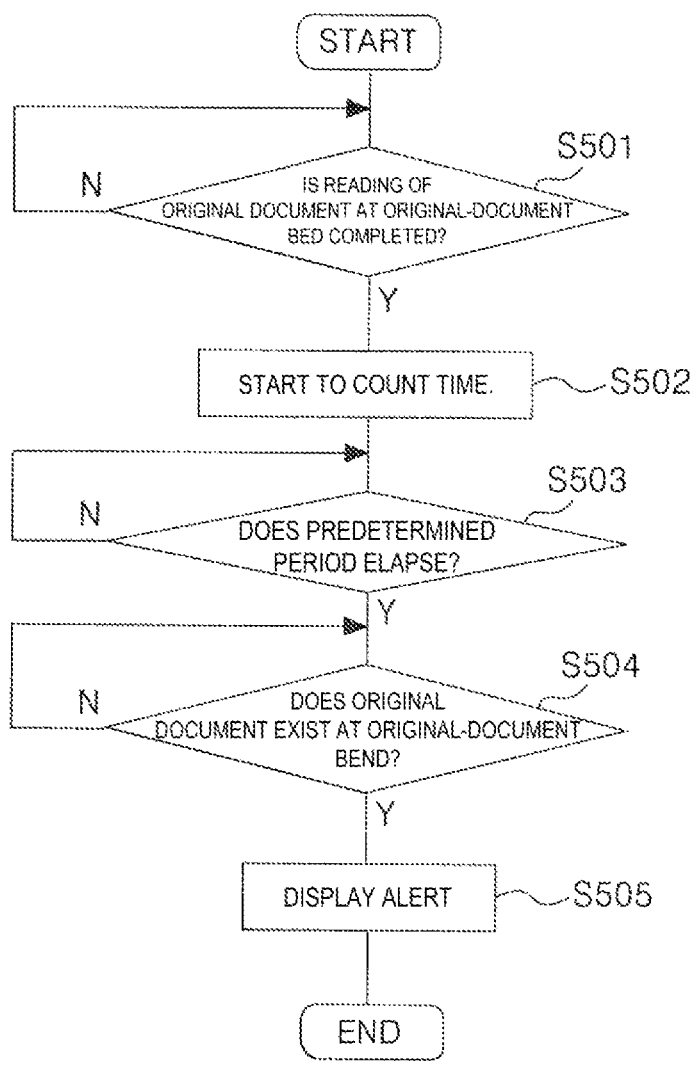
FIG. 9 is a flowchart showing a flow of issuing an alert based on presence or absence of an original document at an original-document table.

In addition, the display unit 105 included in the personal digital assistant 100 can also display the alert display in step S505 in FIG. 9 when an instruction to perform reading is issued from the personal digital assistant 100. Furthermore, when an instruction to perform the reading operation is issued from the personal digital assistant 100, it may be possible to cause the display unit 105 included in the personal digital assistant 100 to display a message indicating that the reading operation is completed.

In addition, when an original document is left at the original-document discharging tray 29 on the basis of a detection signal from the discharged original-document sensor 61, it may be possible to display an alert for giving a warning that the original document is left mounted, at the display unit of the personal digital assistant that issues the instruction to perform the reading operation. Furthermore, when an original document is mounted at the original-document discharging tray 29 on the basis of a detection signal from the discharged original-document sensor 61, it may be possible to display a guide indicating that the device is in use, at a display unit of a personal digital assistant other than the personal digital assistant that issues an instruction to perform the reading operation.

In addition, in a case where an original document is left at the original-document table 14 and the reading operation performed for this original document is based on an instruction from an external terminal, when an instruction to open and close the ADF 12 is given from an external terminal other than the external terminal that gives an instruction to perform the reading operation, it may be possible not to receive such a request.

Figure 11:
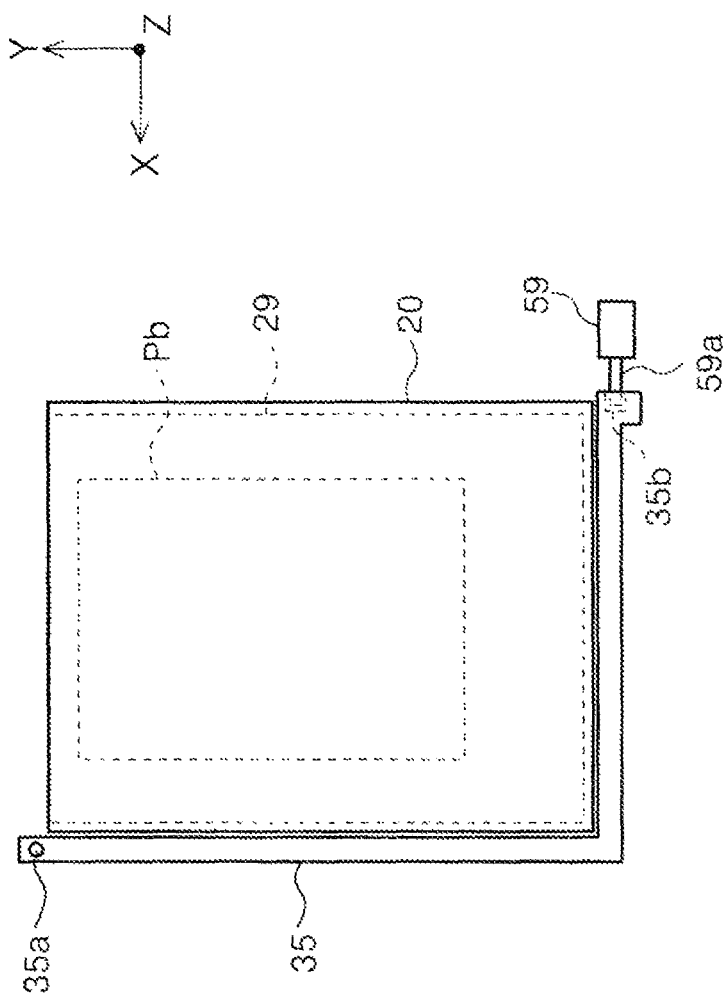
FIG. 11 is a plan view illustrating a state where a cover that opens and closes an original-document discharging tray is closed.

Next, a tray cover 35 serving as a cover member configured to cover the original-document discharging tray 29 will be described. Note that the multifunction device 1 illustrated in FIG. 1 is given as an embodiment that does not include the tray cover 35. FIG. 11 is a diagram used to explain another embodiment that includes the tray cover 35 in the multifunction device 1 illustrated in FIG. 1, and is a plan view illustrating the original-document feeding tray 20 as viewed from the upper side of the original-document feeding tray 20. In this case, the original-document discharging tray 29 is brought into a state of being entirely hidden behind the original-document feeding tray 20.

In FIG. 11, a user is located at the +X direction relative to the original-document feeding tray 20 and the original-document discharging tray 29, and a hand is inserted between the original-document feeding tray 20 and the original-document discharging tray 29 to remove the original document Pb discharged on the original-document discharging tray 29.

The tray cover 35 is used to inhibit such a user from removing the original document Pb, and is formed in a letter-L shape so as to be disposed at the +X direction and the −Y direction relative to a space between the original-document feeding tray 20 and the original-document discharging tray 29. However, the shape of the tray cover 35 is not limited to this. It may be possible to take any shape, provided that the original document Pb that has been discharged to the original-document discharging tray 29 cannot be viewed from a user disposed at the +X direction relative to the original-document discharging tray 29, and this original document Pb cannot be removed.

Figure 12:
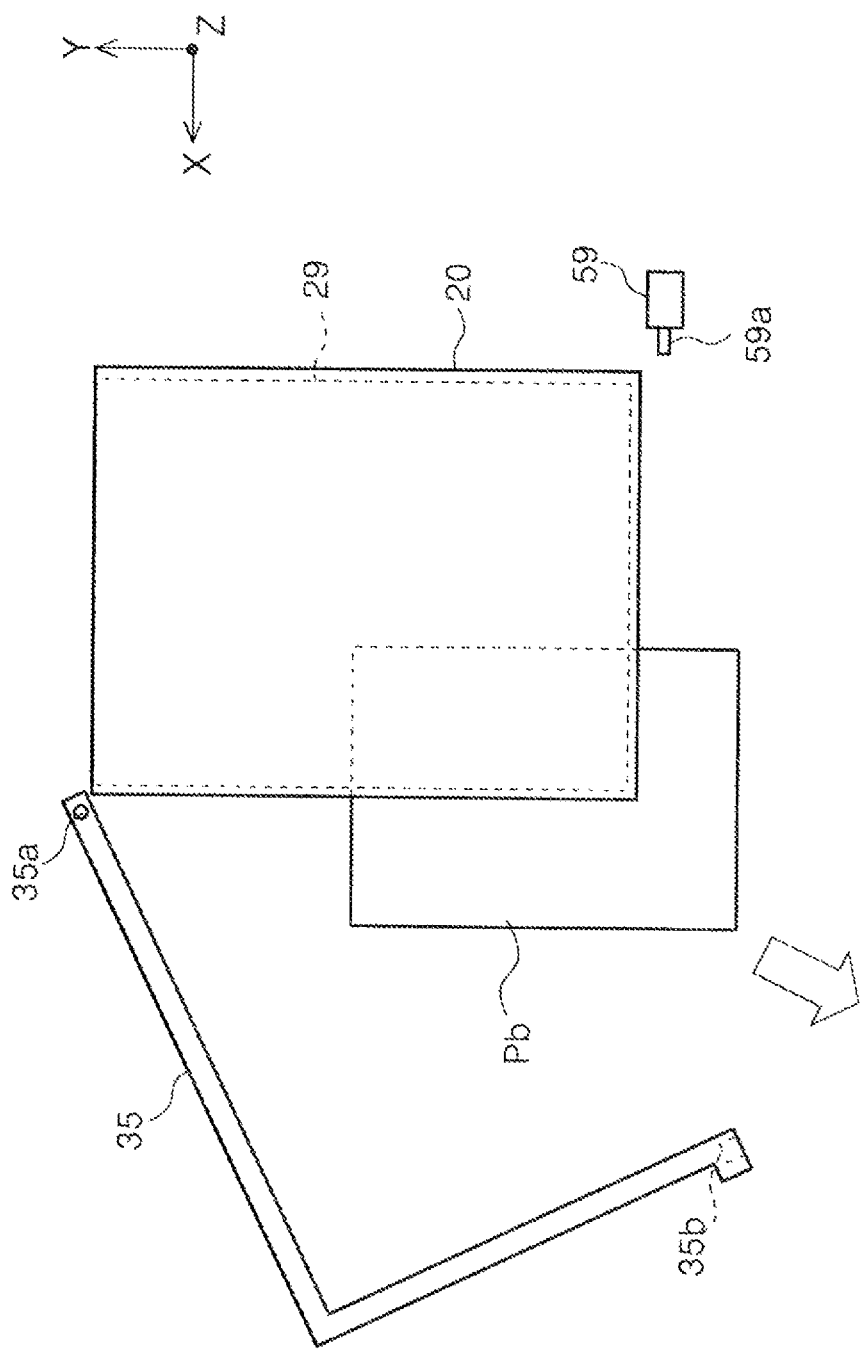
FIG. 12 is a plan view illustrating a state where a cover that opens and closes the original-document discharging tray is opened.

The tray cover 35 is provided rotatably at the X-Y flat surface with a rotary shaft 35a being the center. As it rotates, switch is made between a closed state illustrated in FIG. 11, that is, a state in which a user cannot view the original document Pb that has been discharged to the original-document discharging tray 29 and the original document Pb cannot be removed, and an opened state illustrated in FIG. 12, that is, a state in which the user can view the original document Pb that has been discharged to the original-document discharging tray 29 and the original document Pb can be removed.

A recessed portion 35b is formed at a free-end side at the time when the tray cover 35 rotates. A solenoid 59 is provided at a position that is opposed to the recessed portion 35b in a state where the tray cover 35 is closed as illustrated in FIG. 11, and a plunger 59a of the solenoid 59 is configured to enter the recessed portion 35b.

In a state where the plunger 59a of the solenoid 59 enters the recessed portion 35b, the tray cover 35 cannot rotate, that is, is in a locked state. In a state where the plunger 59a of the solenoid 59 is moved out of the recessed portion 35b, the tray cover 35 can rotate, that is, is in a lock release state. In this manner, the solenoid 59 constitutes a lock unit configured to be able to switch between the locked state in which the tray cover 35 is locked into the closed state and the lock release state in which the lock is released.

Figure 13:
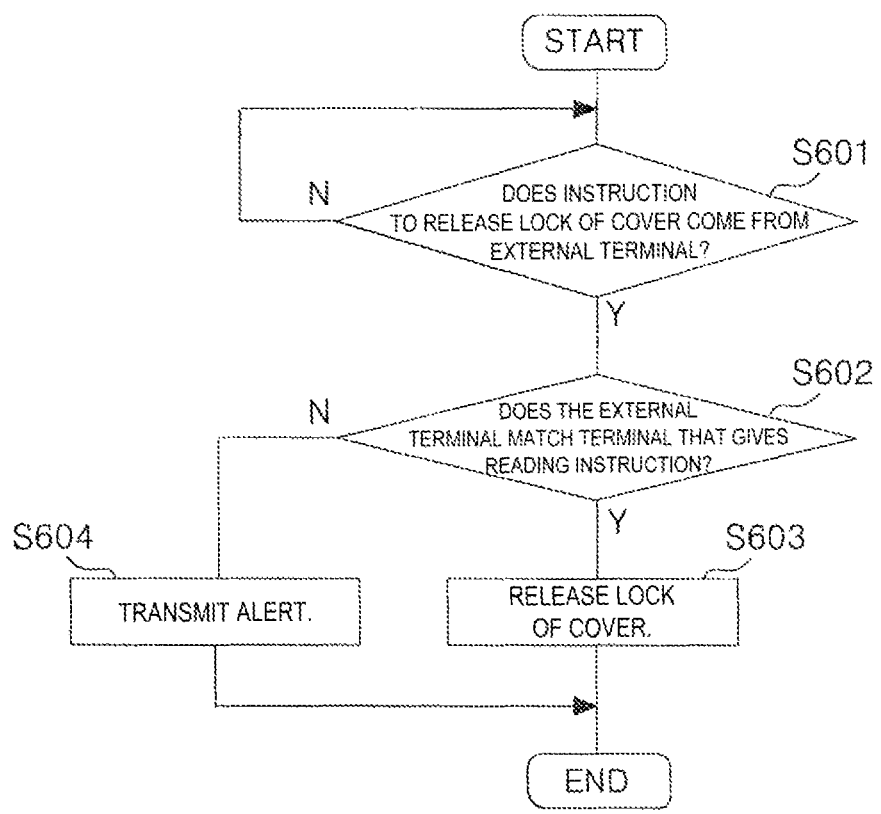
FIG. 13 is a flowchart showing a flow of controlling unlock of a cover lock on the basis of an instruction from an external terminal.

When the reading operation is performed in response to an instruction from the personal digital assistant 100, the control unit 50 acquires identification information unique to this personal digital assistant 100, for example, a physical address of the communicating unit 104. With this configuration, upon receiving an instruction to release the lock of the tray cover 35 from an external terminal such as a personal digital assistant (step S601) as illustrated in FIG. 13, the control unit 50 judges whether or not the identification information unique to the external terminal matches identification information unique to the external terminal that outputs the instruction to perform the reading operation, that is, whether or not the external terminal that outputs the instruction to release the lock of the tray cover 35 is the external terminal that outputs the instruction to perform the reading operation (step S602). When the external terminal that outputs the instruction to release the lock of the tray cover 35 matches the external terminal that outputs the instruction to perform the reading operation (Yes in S602), the lock of the tray cover 35 using the solenoid 59 is released (step S603).

On the other hand, when the external terminal that outputs the instruction to release the lock of the tray cover 35 does not match the external terminal that outputs the instruction to perform the reading operation (No in S602), the lock of the tray cover 35 using the solenoid 59 is not released, and an alert indicating that the tray cover 35 cannot be opened is transmitted to the external terminal that outputs the instruction to release the lock (step S604). In response to this, this external terminal causes the display unit to display an alert. This alert display can be made, for example, by displaying a message "There is still an original document that has been read by other users, so the tray cover cannot be opened" or the like.

Note that, in place of the instruction to release the lock, the instruction from the external terminal in step S601 may be an instruction to perform the reading operation.

In the configuration that includes the tray cover 35 that disables removal of an original document from the original-document discharging tray 29 in the closed state as described above, when the original document is read on the basis of an instruction from an external terminal, the control unit 50 does not release the lock of the tray cover 35 on the basis of an instruction that is not from the external terminal. This makes it possible to prevent a user other than the user who performs reading, from looking at the original document mounted at the original-document discharging tray 29. Thus, it is possible to improve the information security.

In addition, the present disclosure is not given for the purpose of limitation to the embodiment described above. Many variations are possible within the scope of the disclosure as described in the appended claims. It goes without saying that such variations also fall within the scope of the present disclosure.

For example, in each of the embodiments described above, the ADF 12 is given as one example of the opening/closing section configured to open and close the original-document table 14. However, the opening/closing section is not limited to this. It may be a cover configured to open and close the original-document table 14.

Furthermore, each control that has been described with reference to FIGS. 5 to 9 and FIG. 13 may be configured such that switch can be made between enable and disable through the operation unit 6.

What is claimed is:

1. An image reading device comprising:
    an original-document table at which an original document is mounted;
    a reading unit configured to read the original document mounted at the original-document table;
    an opening/closing section configured to open and close the original-document table;
    a power source configured to apply power for opening and closing to the opening/closing section;
    a first proximity sensor configured to output a detection signal in accordance with approach of a detection target; and
    a control unit configured to control the power source to apply power to the opening/closing section to thereby cause the opening/closing section to automatically open or close on a basis of the detection signal from the first proximity sensor.

2. The image reading device according to claim 1 comprising:
    an open-close detection unit configured to detect open or close of the opening/closing section,
    wherein the control unit issues an alert upon determining that the opening/closing section is opened or closed without driving of the power source, on a basis of a detection signal from the open-close detection unit.

3. The image reading device according to claim 1, wherein the opening/closing section is an original-document feeding device configured to feed an original document to a position where the reading unit performs reading, the original document being set at a feeding tray at which the original document is mounted.

4. The image reading device according to claim 1 comprising:
    an edge guide configured to guide a side edge of an original document set at the feeding tray and also configured to be displaced toward and away from the side edge,
    a second power source configured to apply power for displacement to the side edge;
    a second proximity sensor configured to output a detection signal in accordance with approach of a detection target; and
    the control unit configured to control the second power source to apply power to the edge guide to thereby cause the edge guide to automatically displace the side edge on a basis of the detection signal from the second proximity sensor.

5. The image reading device according to claim 4, wherein
    the original-document feeding device comprises:
    a discharge tray configured to support the original document that is read and discharged;
    a cover member configured to be opened and closed, and also configured to enable removal of the original document from the discharge tray in an opened state and disable removal of the original document from the discharge tray in a closed state; and
    a lock unit configured to switch between a locked state in which the cover member is locked in the closed state and a lock release state in which the lock is released, wherein,
    when the reading is performed by the reading unit on a basis of an instruction from an external terminal, the control unit does not release lock of the lock unit on a basis of an instruction that is not from the external terminal.

6. A recording device comprising:
    an apparatus body including a recording section configured to perform recording on a medium; and
    the image reading device according to claim 1 provided at an upper portion of the apparatus body.

7. An image reading device comprising:
    an original-document table at which an original document is mounted;
    a reading unit configured to read the original document mounted at the original-document table;
    an original-document feeding device configured to open and close the original-document table and feed an original document to a position where the reading unit performs reading, the original document being set at a feeding tray at which the original document is mounted;
    an edge guide configured to guide a side edge of the original document set at the feeding tray and also configured to be displaced toward and away from the side edge;
    a power source configured to apply power for displacement to the side edge;

an original-document detection sensor configured to detect presence or absence of the original document on the feeding tray; and a control unit configured to control the power source, wherein the control unit receives a detection signal from the original-document detection sensor, and controls the power source to apply power to the edge guide to cause the edge guide to automatically retract in a direction of retraction when no original document exists at the feeding tray, and cause the edge guide to automatically advance in a direction of advance when the original document is set at the feeding tray.

8. The image reading device according to claim 1, wherein the control unit checks presence or absence of the original document at the original-document table after a predetermined period elapses from a reading operation by the reading unit is completed, and the control unit issues an alert when the original document exists at the original-document table.

9. An image reading device comprising:

an original-document table at which an original document is mounted;

a reading unit configured to read the original document mounted at the original-document table;

an opening/closing section configured to open and close the original-document table;

a power source configured to apply power for opening and closing to the opening/closing section; and a control unit configured to control the power source to apply power to the opening/closing section to thereby cause the opening/closing section to automatically open or close on a basis of a signal received from an external terminal.

* * * * *